July 14, 1936.   H. E. BRUNNER   2,047,725

LATERAL MOTION MOUNTING FOR RAILWAY VEHICLE AXLES

Filed March 23, 1934   4 Sheets-Sheet 1

INVENTOR
HAROLD E. BRUNNER
BY
ATTORNEY

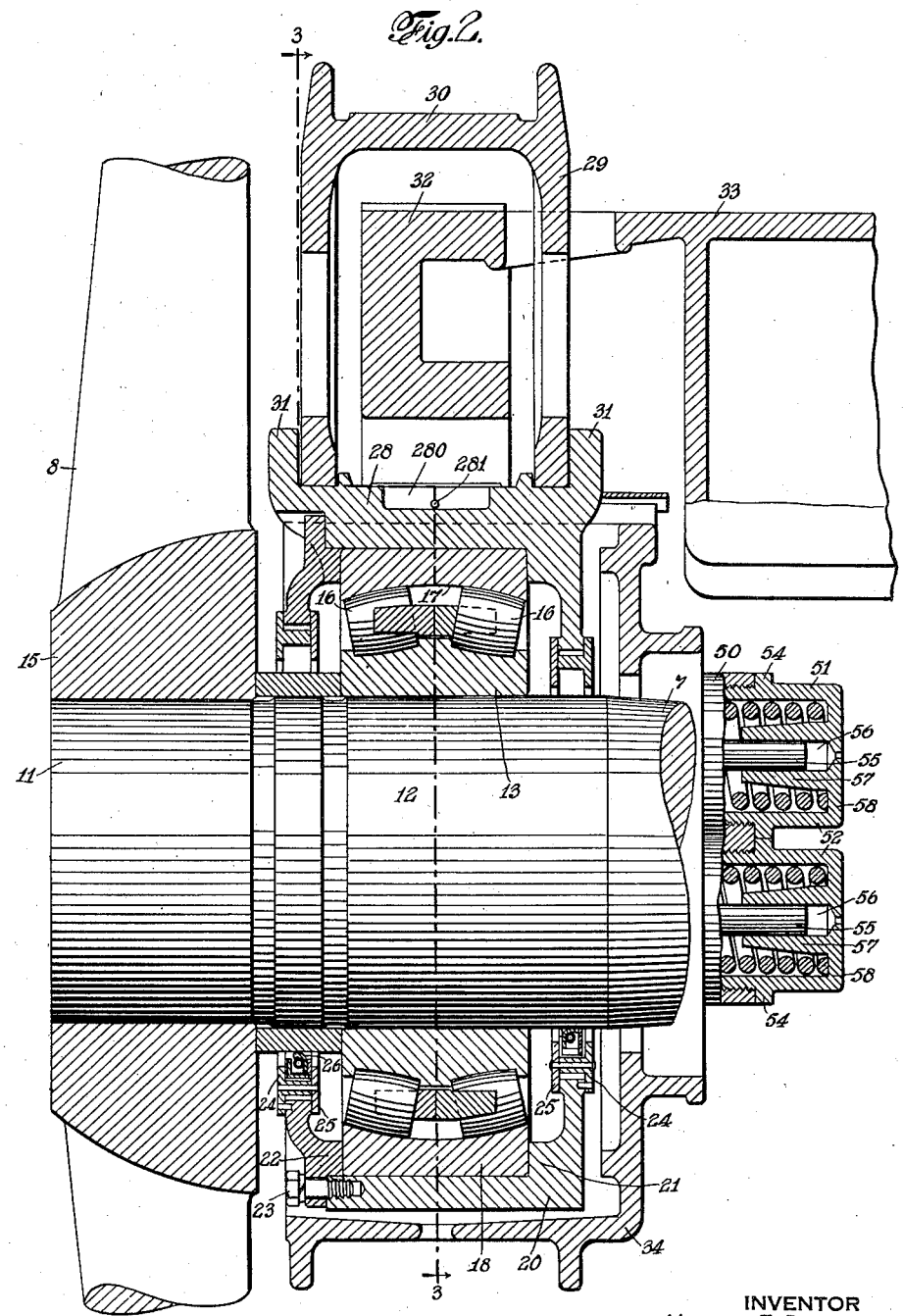

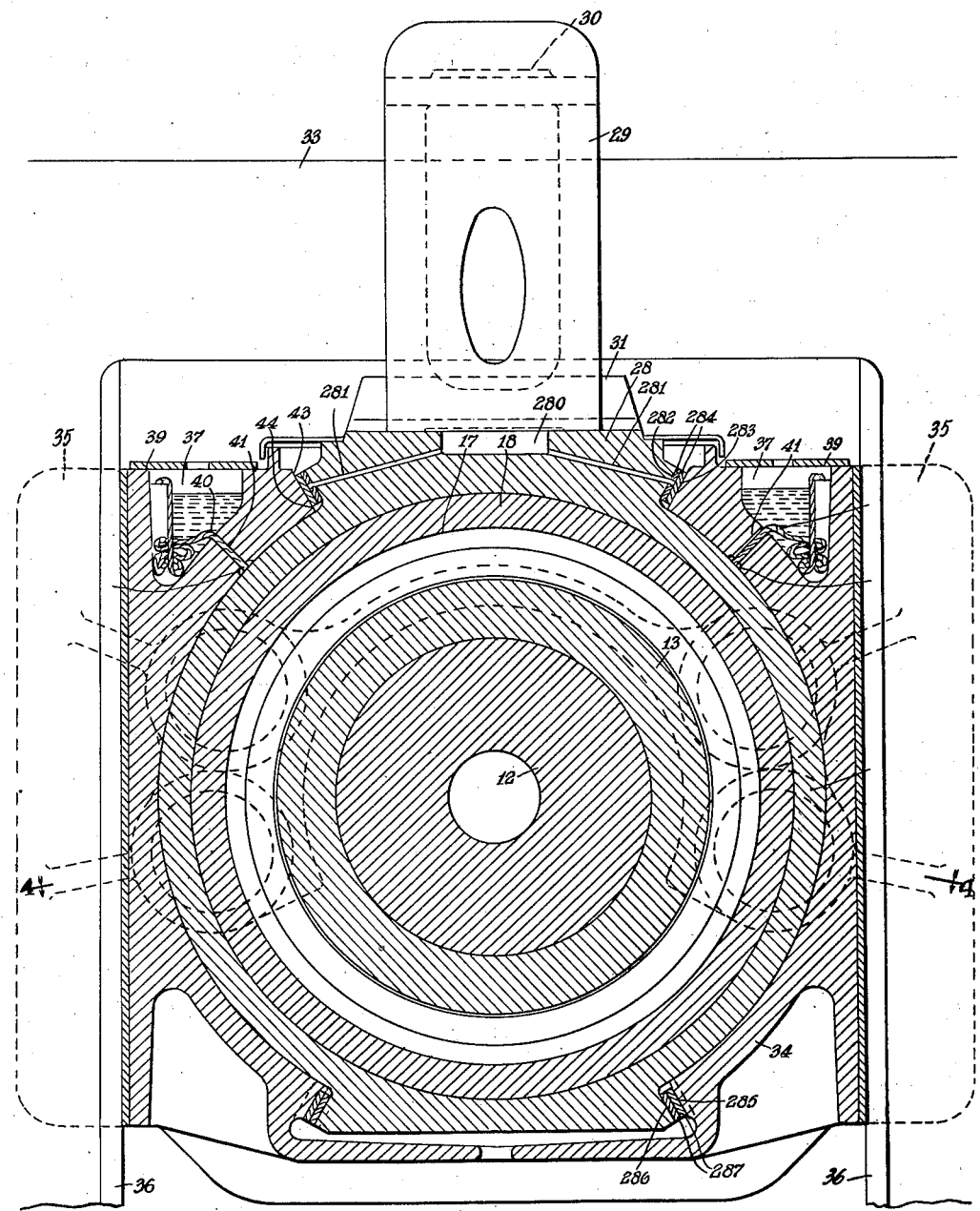

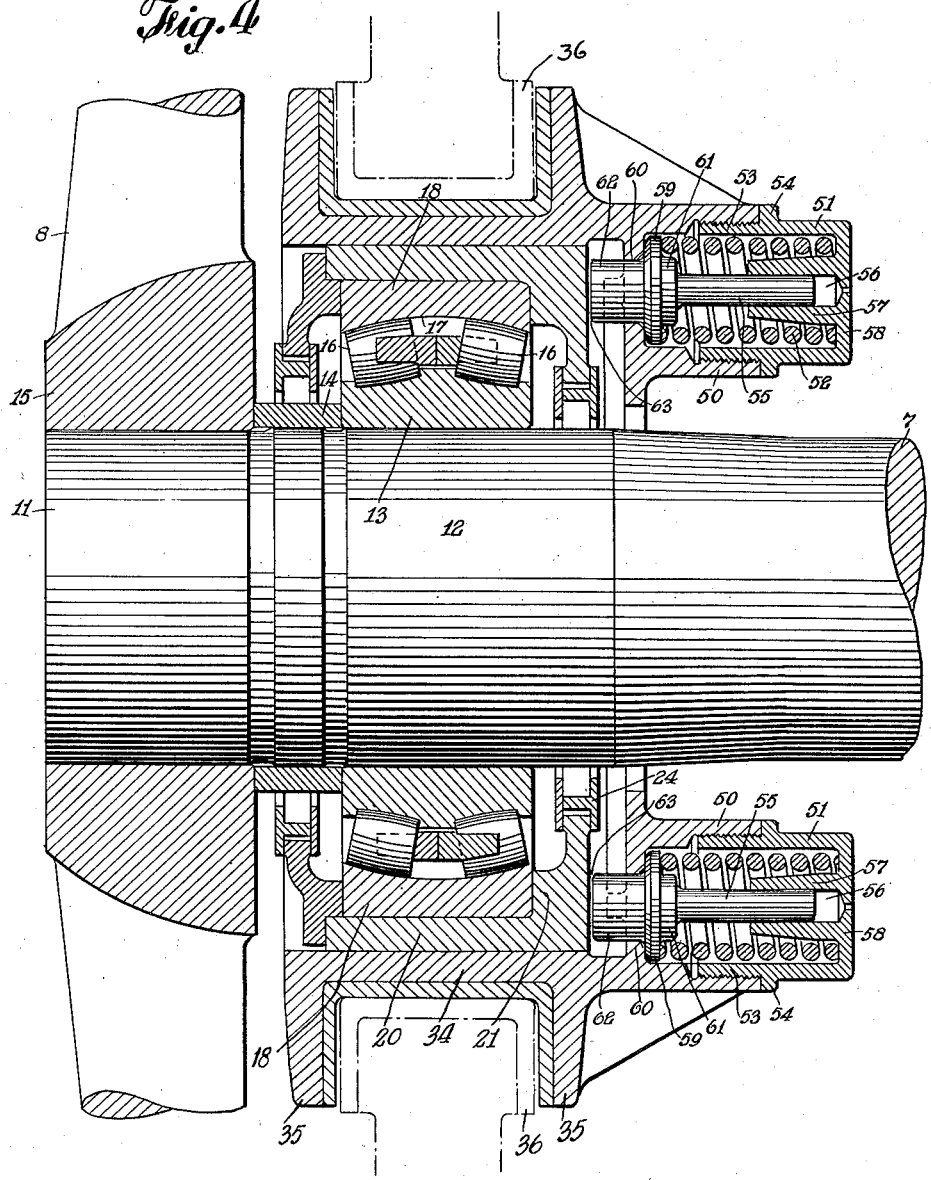

Patented July 14, 1936

2,047,725

UNITED STATES PATENT OFFICE 2,047,725

LATERAL MOTION MOUNTING FOR RAILWAY VEHICLE AXLES

Harold E. Brunner, Larchmont, N. Y., assignor to S K F Industries, Inc., Philadelphia, Pa., a corporation of Delaware Application March 23, 1934, Serial No. 716,979

12 Claims. (Cl. 105—80)

This invention relates to boxes for mounting the bearings for journals and has for an object to provide an arrangement of this character which is peculiarly adapted for mounting the journal bearings on the axles of locomotve engines, an object of the invention being to so mount an anti-friction bearing particularly of the self-aligning type, on locomotive axles, for instance the driving axle, that there will be a limited controlled lateral movement of the bearing and an inner box with the axle and wheel in relation to the outer box, such outer box preferably being laterally stabilized by the pedestals, the inner box being so located that it takes dead or static load of the locomotive.

Another object of the invention is to mount an anti-friction bearing within an inner box which is capable of longitudinal movement within an outer box. Another object of the invention is to rigidly mount a self aligning roller bearing within an inner box and to mount such inner box within an outer box, the inner box being formed with a load supporting portion extending through the upper part of the outer box.

Another object of the invention is to provide in connection with the inner and the outer box a preloaded spring or set of springs for resisting the lateral movement of the axle and the inner box relative to the outer box and the frame.

Another object of the invention is to provide surfaces, in sliding engagement, on the inner and the outer box, in plane with the axis of the axle for preventing rotation of the inner box within the outer box.

Another object of the invention is to so locate the axial thrust receiving members that the stresses of these are carried practically entirely by the boxes, the bearing members and associated parts, and is not imposed upon the axle itself.

Another object of the invention is to provide a system of lubrication for lubricating the surface between the inner and outer boxes, the organization being such that the lubricant is worked into the interspace between the boxes and down to the lower part. The boxes have varying relative movements caused by the forces which are active upon them; some of these forces being caused by the lateral movement of the inner box, by vibration, by piston load, braking load.

Associated with the foregoing is provision for venting the lower portion of the outer box whereby lubricant may pass outwardly and carry with it foreign matter which may find entrance between the two boxes.

In the drawings accompanying this specification one practicable embodiment of my invention is illustrated, in which drawings:—

Fig. 2 is a similar, but more enlarged view of the boxes and associated parts taken from the left hand end of the Fig. 1 showing, some of the parts being illustrated in more detail than in Fig. 1.

Fig. 3 is a cross section of the box assembly, the plane of the section being indicated by a line 3—3 of Fig. 2, and Fig. 4 is a section taken at about plane of the line 4—4 of Fig. 3.

Figure 1:
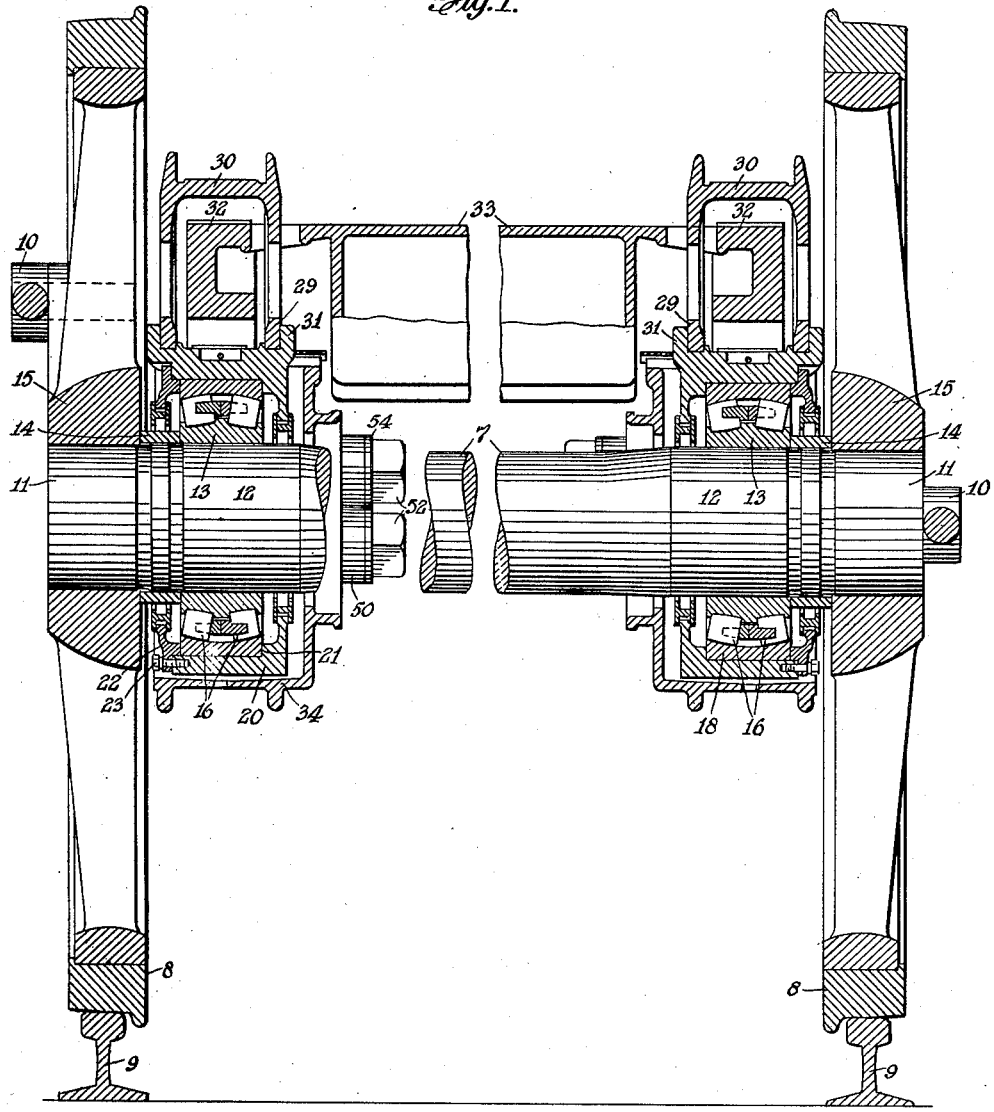
Figure 1 is a view in vertical section of a pair of locomotive driving wheels located upon an axle, and which are shown furnished with a bearing mounting of my improved design, this being mostly shown in vertical section.

While my invention is adaptable for use in many locations yet for the purpose of this description, I have chosen to illustrate it in connection with the driving axle 7 and driving wheels 8 of a locomotive engine. The wheels are shown resting on the tracks 9. The central portion of the axle is broken out, bringing the two sides closer together than they will ordinarily be in practice. The driving shaft connections to the wheels are illustrated at 10. The showing is the present conventional mounting in which the wheels are fastened at the reduced ends 11 of the axle and outboard of the journal portions 12.

This design is particularly adapted for the use of a single self aligning roller bearing mounted on each of the journals. Such bearings are shown as of the two row spherical roller bearing type, there being an inner race ring 13 fast on the journal 12. In the present illustration there is shown an outer distance piece 14 engaging the outboard side of the race ring 13 which is pressed against it by the hub 15 of the wheel 8, when this is pressed upon the reduced end portion 11 of the axle. The two sets of rollers are indicated by the reference character 16, which rollers are shown as tracking upon the inner spherical face 17 of the outer race ring 18 of the bearing. This outer race ring 18 is shown locked up in what I have designated as the inner box 20, it being shown as an integral continuous sleeve completely surrounding the outer surface of the bearing ring 18.

This inner box is preferably provided with a flange 21 for engaging the inboard end of the bearing and with a removable closure plate 22, having a portion for engaging the outboard side of the ring, suitable cap screws 24 being provided for holding the parts securely in position. Inwardly extending flanges 24 and 25 are illustrated (see Fig. 2) which are also shown associated with packing carrying members 26 which cooperate with the distance piece or sleeve 14 and the journal for excluding the entrance of foreign matter to the bearings and for preventing the undue escape of lubricant from them.

Each of the roller bearings shown herein by way of illustration is designed to take radial load and axial or thrust load in both directions axially of the shaft.

The inner box is the member which carries the engine load communicating this to the axle through the anti-friction bearing. The inner box is formed with an upwardly extending integral portion 28 on the top of which rests the saddle 29, on the top 30 of which saddle is applied the load carrying springs. Suitable flanges 31 are provided for holding the saddle in position. The ends 32 of the frame 33 are shown in the usual position within the saddles.

The inner box 20 is shown mounted within an outer box 34 which is represented as formed with channels 35 for receiving the pedestals 36 of the frame 33. The fitting of the outer box within the pedestals will constrain the box against any lateral movement. The outer box is therefore confined to a vertical movement. The play can, of course, be controlled by the introduction of adjusting wedges. The design precludes any possibility of the heavy static load being imposed on the outer box. The function of the outer box as regards carrying load is to take care of the driving forces only. Such outer box is illustrated as being formed from a single integral casting.

The means for lubrication illustrated herein comprise two cavities 37 which are formed in the upper part of the outer box, for receiving oil, a body of oil being illustrated in Fig. 3. Suitable cover plates 39 will, of course, be provided. The oil is preferably fed into the joint existing between the inner and the outer boxes by means of a wick 40, passing through a suitable opening 41, preferably located at an appreciable distance above the bottom of the cavity 37. The inner surface of the outer box is preferably formed with a recess 42 in communication with the oil cavity 41. The upper portion of the inner surface of the outer box just below the opening 43 therein, through which the upwardly extending member 28 of the inner box extends, is shown relieved at 44 which cooperates with the recess 42 for receiving oil and applying it to the surfaces between the inner and the outer boxes. The driving load is carried by both boxes and the static load is carried by the inner box only.

An oil well 280 and two oil ducts 281 are formed in the upstanding portion 28 for supplying oil to the two sets of wear faces 282 and 283, formed on the inner and outer boxes in the plane of the axis of the axle for preventing rotation of the inner box within the outer box. The sliding engagement is facilitated by the introduction of wear plates 284. Two sets of faces 285 and 286 are provided at the bottom of the boxes for assisting in preventing relative rotation, the sliding engagement between these faces being also facilitated by the introduction of wear plates designated 287.

It might be well, at this point, to interject the statement that there are two principal relative movements between these boxes, one being the lateral reciprocation of the inner box within the outer, due to the weaving of the wheels on the axles. The other is the movement occasioned by the piston thrust. This latter movement, augmented by the vibration of the parts, is instrumental in causing the oil to flow between the engaging surfaces of the boxes, because on each reversal of movement, one or the other side will be opened and the other tightly closed. This is one reason why a lubrication cavity is provided at each side.

It has been proposed to employ a set of preloaded springs, preferably carried by the outer box and arranged to control lateral motion of the axle by reacting through a bearing fixed on the axle and mounted for lateral movement in the axle box. In the present invention springs of this kind are employed for a similar purpose but, as shown and described, they react through an inner box which surrounds the bearing and which box is laterally movable within the outer box.

The form of preloaded spring illustrated herein is capable of positively resisting movement exerting a pressure on the springs up to the combined amount of their preloading; of yielding and resisting the movement beyond such amount; and thereafter, upon the convolutions of the coils being pressed together, positively resisting further relative movement. These springs are illustrated in detail in Figures 2 and 4 and their preferable location is indicated in Fig. 3. The members of a pair of springs are shown located just above and below the center horizontal plane at the back of the box and the members of another pair similarly located at the front of the box. The illustrated details of this spring mounting and construction comprise for each spring a housing 50 formed as an extension of the outer journal box. A cap 51, which, with the housing 50, receives the coiled spring 52, has an inwardly directed portion 53 in screw thread engagement with the housing, a flange 54 being provided for limiting the inward movement of the cap. Such inward movement serves to compress and preload the spring. The parts will, of course, be so proportioned in relation one to the other, that the desired amount of preloading is thus effected when the cap is completely screwed into position.

Within the housing there is shown located what may be termed a spring pin, there being a pin member 55, preferably free of the spring, and mounted to reciprocate in a socket 56, formed by means of a sleeve 57 projecting inwardly from the head 58 of the cap 51. This is for guiding the pin in its movement. The pin has a head 59 which is normally pressed against the bottom plate 60 of the spring housing. Preferably a hub 61 is formed between the pin portion 55 and the plate 59 for centering the spring, but this hub will normally be free of the convolutions of the spring.

The spring pin has an enlarged end 62 extending outwardly through the bottom plate 60 and located in position to be contacted by the flange 21 of the inner box 20 when this, with the wheels, axle and associated parts, moves inwardly in relation to the outer journal box, pedestal and frame.

The parts are shown in what may be assumed to be a normal position in Fig. 4, that is the spring 52 being preloaded and ready for receiving the impact from the relative movement of the parts. In this view there is illustrated an amount of clearance at 63. The sum of the amount of clearance at 63 and the compressibility of the spring 52 should be comparable with the usual lateral freedom afforded in the type of vehicle to which the device is applied, or which its designers may regard as desirable.

According to the present illustration, the set of springs at each end of the axle takes care of an inwardly wheel and axle movement at that side of the vehicle. Movement in the other direction, or an outward movement of the wheels and axle, is taken care of at the other side of the vehicle.

In the foregoing description and in some of the appended claims, I employed the term "reciprocation" in referring to the movement of the inner box within the outer box. This term, of course, when considered in relation to the railway vehicle itself, is what would be known as lateral; reciprocation in railroad usage being the term applied to the movement of the cross head, and to any forward and backward movement communicated from it to the associated parts.

Having thus described my invention, I claim and desire to secure by Letters Patent:

1. The combination with an outer journal box having pedestal engaging faces and formed with an opening through its top, of an anti-friction bearing having an outer race ring, and an inner box surrounding the outer race ring of the bearing and mounted within the outer box to freely reciprocate therein, the inner box being formed with a load carrying part extending through the said opening.

2. The combination with a journal box having stabilizing faces and formed with an opening through its top, of an anti-friction bearing having an outer race ring, an inner box surrounding the outer race ring of the anti-friction bearing and mounted within the outer box to freely reciprocate therein, the inner box being formed with a load carrying part registering with the opening through the journal box.

3. The combination with a journal box having stabilizing faces and formed with an opening through its top, of an anti-friction bearing having an outer race ring, and an inner box surrounding and embracing the perimeter of the anti-friction bearing and mounted within said journal box to freely reciprocate therein, the inner box being formed with a load carrying part registered with the opening through the journal box.

4. The combination with a locomotive axle journal, of a combined radial and thrust self aligning roller bearing mounted thereon, a member surrounding and secured to the outer part of the roller bearing and formed with an upstanding load carrying part, and a journal box within which the said member is mounted to freely reciprocate, the journal box having an opening through its top for the accommodation of the upstanding load carrying part.

5. The combination with a locomotive axle, wheels mounted at the ends of the axle, and the journals disposed inwardly of the wheels, of a combined radial and thrust self aligning roller bearing mounted on each of the journals, and a member surrounding and secured to the outer part of the roller bearing and adapted to move therewith in conformity with the axle and wheel movement, such member being formed with a load carrying part, and a journal box within which the said member is mounted to freely reciprocate, the journal box having an opening through its top registering with the load carrying part of the inner member, said journal box also having stabilizing faces.

6. The combination with a combined radial and thrust self aligning roller bearing, of a member surrounding and secured to the outer part of the bearing, a journal box within which the said member is mounted to freely reciprocate, and means free of the outer box for applying radial load to said member.

7. The combination with a journal box having stabilizing faces and formed with an opening through its top, of an anti-friction bearing having an outer race ring, and an inner box surrounding and embracing the perimeter of the anti-friction bearing and mounted within said journal box to freely reciprocate therein, the journal box being formed with oil cavities in the upper front and rear portion, and means for feeding oil therefrom to the space between the boxes at the upper front and rear parts.

8. The combination with a journal box having stabilizing faces and formed with an opening through its top, of an anti-friction bearing having an outer race ring, an inner box surrounding and embracing the perimeter of the anti-friction bearing and mounted within said journal box to freely reciprocate therein, and mounted within the outer box to freely reciprocate therein, and spring means associated with the journal box, and active upon the inner box, for returning it and the bearing to normal positions.

9. The combination with a journal box having stabilizing faces and formed with an opening through its top, of an anti-friction bearing having an outer race ring, and an inner box surrounding and embracing the perimeter of the anti-friction bearing and mounted within said journal box to freely reciprocate therein, the journal box being formed with oil cavities and means for feeding oil therefrom to the space between the boxes at the upper front and rear parts.

10. The combination with a journal box having stabilizing faces and formed with an opening through its top, of an anti-friction bearing having an outer race ring, and an inner box surrounding and embracing the perimeter of the anti-friction bearing and mounted within said journal box to freely reciprocate therein, there being oil grooves and relieved surfaces formed between the inner box and the journal box, the journal box being formed with oil cavities in the upper front and rear portion, and means for feeding oil therefrom to the space between the boxes at the upper front and rear parts.

11. In an open-topped journal bearing box for a railway vehicle axle, an annular housing adapted to surround the bearing and closely fit the inside of said box and having a load-receiving upward extension adapted to project through the opening in the top of the box.

12. The combination with an open-topped journal bearing box for a railway vehicle axle, of an annular inner housing adapted to embrace the bearing and to slidingly fit within the box so as to freely reciprocate therein in a direction transverse of the vehicle, said housing having a load receiving upward extension adapted to project through the opening in the top of the box.

HAROLD E. BRUNNER.